May 12, 1953  M. R. LUDWIG  2,637,911
AIRCRAFT INSTRUMENT
Filed Feb. 25, 1946  2 Sheets-Sheet 2
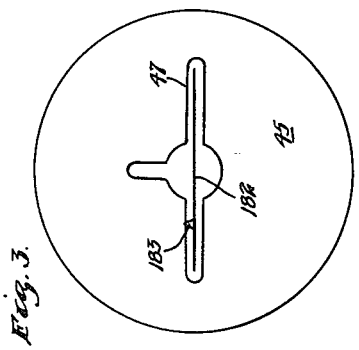
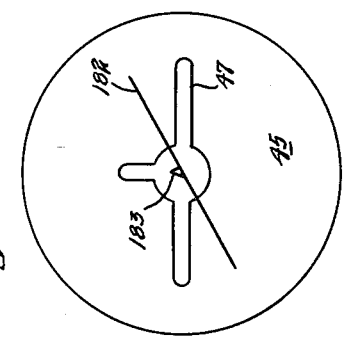
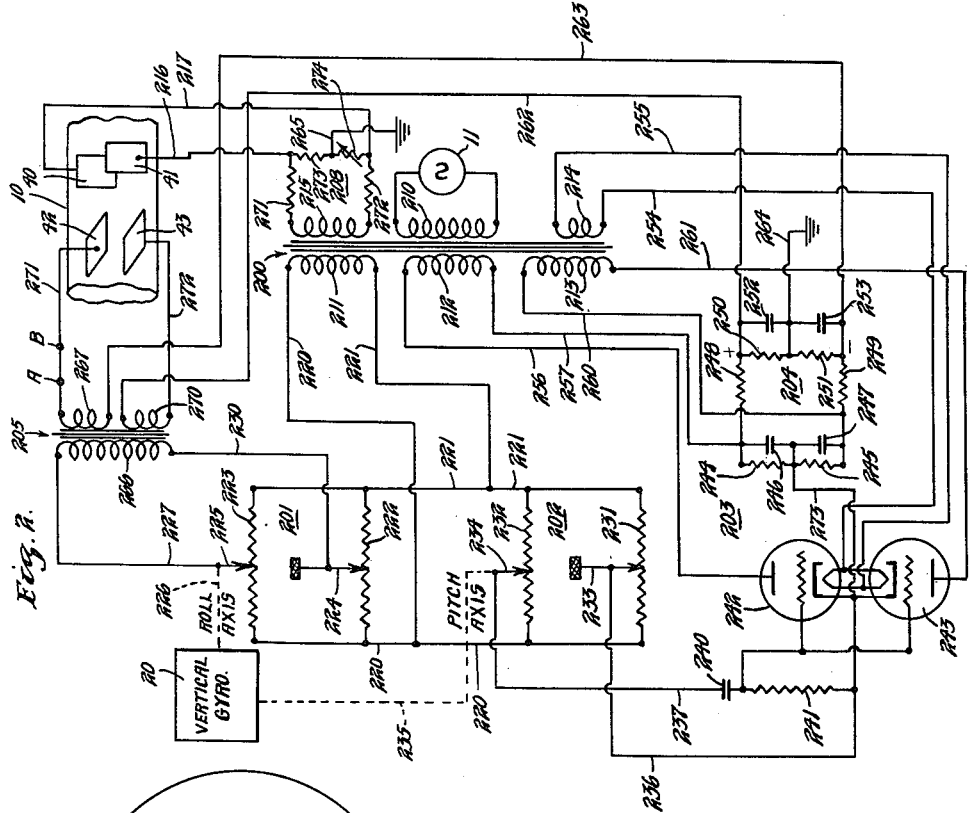
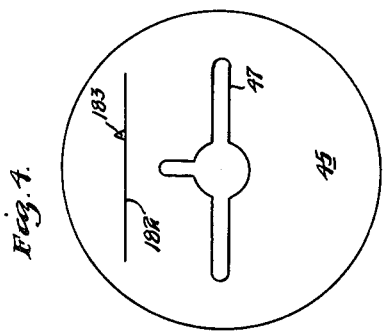
INVENTOR.
MERLE R. LUDWIG
BY
*George H. Fisher*
ATTORNEY Patented May 12, 1953

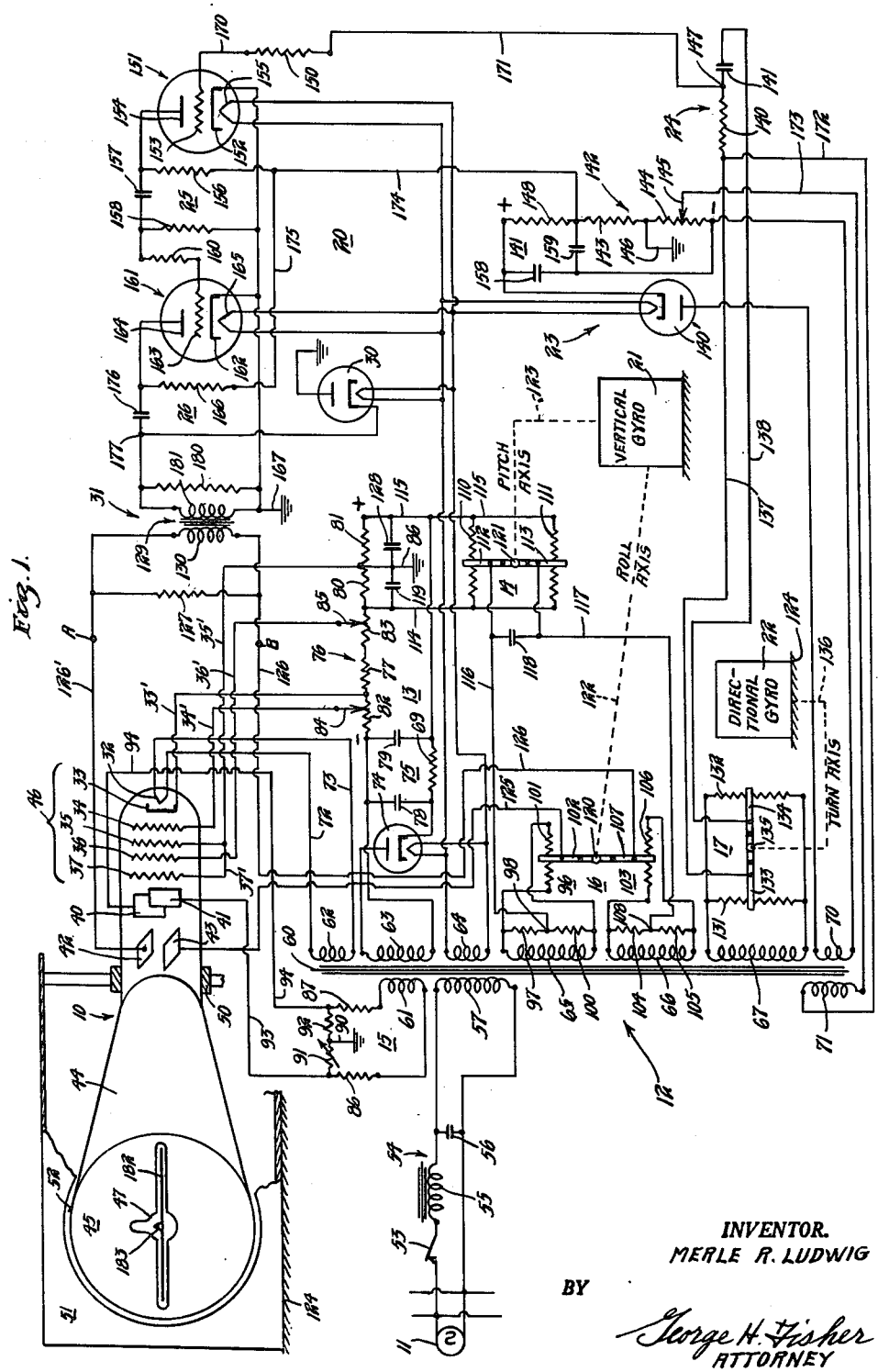

2,637,911

UNITED STATES PATENT OFFICE 2,637,911

AIRCRAFT INSTRUMENT

Merle R. Ludwig, Minneapolis, Minn., assignor to Minneapolis-Honeywell Regulator Company, Minneapolis, Minn., a corporation of Delaware Application February 25, 1946, Serial No. 650,047

12 Claims. (Cl. 33—204)

This invention relates to the field of aircraft instruments, and more particularly to instruments for mounting on the control panel of an aircraft for assisting in navigation of the craft.

It is an object of this invention to provide an improved instrument for indicating the attitude of an aircraft.

It is another object of the invention to provide an improved instrument for indicating the attitude of an aircraft at a point remote from attitude sensing devices.

It is an object of the invention to provide an improved cathode ray indicator of attitude for aircraft.

It is another object of the invention to provide improved means for moving the trace on a cathode ray tube screen to give an indication significant of the relation between the attitude of the craft and a chosen attitude.

It is a further object of the invention to provide improved means for translating a horizontal linear trace on a cathode ray tube screen in accordance with pitch of an aircraft carrying the instrument.

It is still another object of the invention to provide an improved means for rotating a horizontal linear trace on a cathode ray tube screen in accordance with roll of an aircraft carrying the instrument.

It is a further object of the invention to provide an improved means for combining translation and rotation of a horizontal linear trace on a cathode ray tube screen in accordance with departure of a craft carrying the instrument from a level attitude having both pitch and roll components.

It is a further object of the invention to provide an improved aircraft instrument comprising a cathode ray tube having a normally horizontal trace whose movement simulates the apparent movement of the horizon with respect to the craft.

It is a further object of the invention to provide an improved aircraft instrument comprising a cathode ray tube having a horizontal trace with a normally centered peak, together with means displacing the peak from its central position on departure of the craft from a desired heading.

It is yet another object of the invention to provide an improved aircraft instrument comprising a cathode ray tube having a normally horizontal trace with a normally centered peak, together with means translating and rotating the trace from its normal position and displacing the peak along the trace in accordance with pitch, roll, and turn respectively, of the craft.

The utility of the invention is not to be considered as limited to repeating the indications of a gyroscope, or even to use for showing the attitude of a craft. It is accordingly an object of the invention to provide electron discharge means giving distinguishable responses to changes in a plurality of conditions.

It is another object of the invention to provide means giving distinguishable responses to the variations in each of the components of a complex voltage impressed thereon.

It is another object of the invention to provide means energized with a single voltage of complex wave form and giving a first response to the alternating component of said voltage, a second response to the continuous unidirectional component of said voltage and a third response to the pulsating unidirectional component of said voltage.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which are illustrated and described certain preferred embodiments of the invention.

In the drawing:

Figure 1 is a schematic showing of one embodiment of the invention;

Figure 2 is a schematic showing of a portion of a modification of the invention; and Figures 3, 4, and 5 illustrate indications of the instrument of Figure 1 for various attitudes of the aircraft.

In controlling the flight of aircraft it is important that the pilot be informed at all times of the attitude of the craft with respect to the earth. The normal attitude of the craft in flight is a level and directed one; that is, the longitudinal or roll axis of the craft and the transverse or pitch axis of the craft are level, and the craft has a selected heading or attitude about its vertical or turn axis. The customary instrument for indicating the attitude of the craft about the roll and pitch axes is a vertical gyroscope, while its attitude about the turn axis is ordinarily indicated by an azimuth instrument such as a directional gyroscope or a compass.

The instrument panel of the modern aircraft is very complex, and space on the panel is limited.

Anything that can be done to reduce the number of instruments on the panel, by combining instruments, or to decrease the panel space required for an instrument or an instrument group, is of great advantage. Similarly, a great advantage is to be gained by placing bulky instruments or instruments requiring frequent maintenance in more easily accessible locations than are available on the panel. For this purpose, the use of repeaters on the panel to perform the visible functions of larger actual instruments remotely located is rapidly becoming more widespread. The present invention comprises a telemetric system making use of a single panel instrument to repeat the indications of both a vertical gyroscope and an azimuth instrument.

The panel instrument comprises a cathode ray oscilloscope tube arranged to normally display on its viewing screen a linear trace with a small peak. The tube is mounted on the panel in association with an index of attitude in the form of an aircraft outline which is adjustable for coordination with the attitude of the craft, and the trace may be coordinated with the outline. In the normal condition of the panel instrument, the outline and the trace are horizontal and centered with respect to the screen of the tube, and the peak is at the center of the trace.

Roll responsive and pitch responsive means are associated with the vertical gyroscope, and turn responsive means are associated with the azimuth instrument. The responsive means are in their normal conditions when the craft is in its normal attitude, which will be referred to as straight and level flight. Under these conditions, the panel instrument, whose indications are controlled by the responsive means, is in its normal condition.

If the craft departs from its normal attitude about its pitch axis, the trace on the panel instrument is translated vertically to take up a new position parallel to its old one at a distance and in a direction therefrom determined by the pitch of the craft. If the craft departs from its normal attitude about its roll axis, the trace on the panel instrument is rotated about its center to take up a new position at an angle with respect to its former position determined by the amount and direction of bank of the craft. If the craft departs from its normal attitude about its turn axis, the peak on the trace is displaced from its central position in a direction and to an extent determined by the turn of the craft.

The main components of a system embodying the invention are shown in Figure 1 to include a cathode ray oscilloscope tube 10 energized from a suitable source 11 of electrical energy through a transformer 12 and a unidirectional voltage power supply 13, which also energizes a pitch axis network 14. Transformer 12 also energizes a sweep circuit 15, a roll axis network 16, a turn axis network 17, and a wave shaping system 20. Pitch axis network 14 and roll axis network 16 are controlled by a vertical gyroscope 21, and turn axis network 17 is controlled by a directional gyroscope 22. Wave shaping system 20 includes a power supply 23, a phase shifter 24, a two-stage wave squaring amplifier 25, a differentiating network 26, a clipping tube 30, and a coupling network 31.

Cathode ray tube 10, which is of conventional structure, is shown to comprise an electron gun 46, including a heating filament 32, an electron emissive cathode 33, a control electrode 34, a first accelerating electrode 35, a focusing electrode 36, and a second accelerating electrode 37, as well as a pair of horizontally effective deflecting plates 40 and 41, and a pair of vertically effective deflecting plates 42 and 43. All these electrodes are mounted in a glass envelope 44 having an enlarged end carrying a fluorescent screen 45. In actual use the tube 10 must preferably be enclosed in a suitable magnetic and electrostatic shield to eliminate spurious deflections of the beam: this shield is omitted from the drawing.

The movement of the trace on screen 45 of cathode ray tube 10 follows the apparent movement of the horizon with respect to the craft, and for this movement of the trace to have significance an index of attitude 47 in the shape of an aircraft outline, which partakes of all the changes of attitude of the craft, is associated with screen 45. It has been found convenient to mark this outline directly on the outer surface of the end of tube 10, so that its center is located at the center of the screen, and so that its longer axis extends in the direction of displacement of the electron beam in response to energization of the horizontally effective plates 40 and 41 with alternating voltage. Outline 47 may be coordinated with the attitude of the plane by suitable adjustment of the tube in a ring 50 or other mount fixed to the panel 51 of the aircraft. The tube is mounted behind panel 51, and screen 45 and outline 47 are visible through an aperture 52 provided in the panel.

It is well-known to those skilled in the art, that energization of electron gun 46 is effective to direct a beam of electrons from cathode 33 to impinge on screen 45, the beam passing between plates 40 and 41 and between plates 42 and 43. Any difference in potential between plates 40 and 41 is effective to displace the point of impingement of the beam on the screen in a horizontal direction, although for satisfactory centering of the trace the potentials of the plates must be equally and oppositely displaced from the potential of the second accelerating electrode. Similarly, any difference in potential between plates 42 and 43 is effective to displace the point of impingement in a vertical direction. If either of these potential differences is of an alternating nature, the displacement of the point becomes a line along which the point of impingement moves back and forth, and if alternating voltages of proper phase are impressed on both pairs of deflecting plates, the line has an angle with respect to the horizontal whose magnitude depends on the amplitude relationship between the alternating voltages.

Electrical energy for electron gun 46, and for all the other components of the system, is provided from a source 11 of alternating voltage of a selected frequency. In aircraft applications, source 11 ordinarily comprises an inverter, and as suggested in the drawing this inverter provides energy for other loads in the craft in addition to the present instrument. Energization of the invention from the inverter is controlled by a switch 53, and since the output of an inverter is frequently rich in upper harmonics, a line filter 54 comprising a choke 55 and a capacitor 56 is provided to remove these higher frequency components, which have an adverse effect on the operation of the instrument. After passing through filter 54, electrical energization from source 11 is conducted to the primary winding 57 of transformer 12. By the means just described transformer 12 is provided with primary energization with alternating voltage of substantially a single selected frequency.

Wound on a core 60 common to primary winding 57 are nine secondary windings 61, 62, 63, 64, 65, 66, 67, 70 and 71. Of these, windings 62 and 64 provide low voltages for heater filament energization, windings 63 and 70 provide voltages for rectifier energization, and windings 61, 65, 66, 67 and 71 provide voltages having magnitudes suitable to the control circuits they respectively energize. Transformer 12 is thus the source of electrical energization for all the remaining portions of the instrument.

Secondary winding 62 of transformer 12 is connected to heater 32 of cathode ray tube 10 by conductors 72 and 73. Energization of this circuit is effective to bring cathode 33 of cathode ray tube 10 into a thermoemissive condition.

Power supply 13 is of conventional nature and is shown to comprise an electronic rectifier 74, a resistance-capacitance filter 75, and a voltage divider 76 made up of fixed resistors 77, 80 and 81 and variable resistors 82 and 83 provided with taps 84 and 85, respectively. Rectifier 74 is provided with heater energization from secondary winding 64 of transformer 12, and with anode energization from secondary winding 63 of transformer 12. Under these conditions, the left-hand end of voltage divider 76 is maintained negative with respect to the right-hand end of the divider.

Voltage divider 76 functions to provide beam control voltages for electron gun 46. The potential of cathode 33 is determined by conductor 33' and control electrode 34 is maintained at a variable negative potential with respect to the cathode by conductor 34': variation of this potential adjusts the intensity of the trace. Focusing electrode 36 is maintained at a variable positive potential with respect to the cathode by conductor 36' for focusing the electron beam, and the accelerating electrodes 35 and 37 are maintained at a fixed positive potential with respect to the cathode above any other potential on the electron gun by conductors 35' and 37'.

An alternating voltage is provided for horizontally effective plates 40 and 41 of cathode ray tube 10 by secondary winding 61 of transformer 12. This circuit is completed through a pair of voltage dropping resistors 86 and 87 and a pair of load resistors 91 and 92 connected in series, and the plates are maintained at opposite potentials with respect to the grounded accelerating electrodes by grounding the common point between resistors 91 and 92 as at 90. Secondary winding 61, resistors 86, 87, 91 and 92, and ground connection 90 comprise horizontal sweep circuit 15, which is effective through conductors 93 and 94 to impress on plates 40 and 41 an alternating voltage which causes the beam of the cathode ray tube to sweep back and forth across the screen in a straight line at the frequency of source 11.

Secondary winding 65 energizes an electric bridge 96 comprising fixed resistors 97 and 100 and a variable resistor 101 having a sliding contact 102. Resistors 97 and 100 are of equal resistance, and therefore when slider 102 is at the center of variable resistor 101, the output of bridge 96 between junction 98 and slider 102, is zero. In the same fashion, secondary winding 66 of transformer 12 energizes a second bridge 103 made up of fixed resistors 104 and 105 of equal resistance and a variable resistor 106 having a sliding contact 107. The output of bridge 103, between junction 108 and slider 107, is also zero when slider 107 is at the center of its winding. Bridges 96 and 103, together with secondary windings 65 and 66, make up the roll axis network 16.

The voltages delivered by windings 65 and 66 are preferably equal, so that a given displacement of slider 102 with respect to its winding 101 brings about the same voltage unbalance in bridge 96 as does an equal displacement of slider 107 with respect to winding 106 of bridge 103. Sliders 102 and 107 are arranged for unitary operation with respect to their windings, and the windings themselves are so connected to the transformer secondaries that for any particular instant in the cycle of the alternating voltage energizing the transformer, movement of slider 102 in such a direction as to increase its positive polarity results in movement of slider 107 in such a direction as to increase its negative polarity, and vice versa. Thus, as far as alternating voltages supplied by secondary windings 65 and 66 are concerned, the voltage between sliders 102 and 107 depends in magnitude and in phase on the amount and direction of displacement of the sliders.

Pitch axis network 14 comprises an electric bridge made up of a pair of variable resistors 110 and 111 whose sliders 112 and 113, respectively, comprise the output terminals of the bridge. The bridge is energized with unidirectional voltage from voltage divider 76 by conductors 114 and 115. Sliders 112 and 113 are arranged for unitary movement with respect to their windings, in such a fashion that when the sliders are at the centers of their windings no unidirectional potential difference exists between them, but when the sliders are displaced from their central positions this takes place in such a fashion that while one of them is made increasingly positive the other is made increasingly negative, and vice versa.

The unidirectional voltage between sliders 112 and 113 is impressed on output terminals 98 and 108 of bridges 96 and 103 by conductors 116 and 117, which are bridged by a by-pass condenser 118, whose function is to prevent alternating voltages of significant amplitude from being fed into the pitch axis network and thence back into power supply 13 to affect the voltage supplied to the accelerating anodes. A pair of further condensers 119 and 128 are bridged across resistors 80 and 81 in an effort to even more completely by-pass any such alternating voltages. Thus, if sliders 102 and 107 are at the center of their resistance windings, and sliders 112 and 113 are displaced from their central positions, a unidirectional voltage appears between sliders 102 and 107 whose magnitude and polarity depend on the amount and direction of displacement of sliders 112 and 113. If sliders 112 and 113, on the other hand, are at the centers of their windings, while sliders 102 and 107 are displaced from their central positions, an alternating voltage appears between sliders 102 and 107 whose amplitude and phase are determined by the amount and direction of displacement of those sliders themselves. When both pairs of sliders are displaced from their central positions at the same time, the potential difference between sliders 102 and 107 is of a compound wave form having a unidirectional component determined by the displacement of sliders 112 and 113, and an alternating component determined by the displacement of sliders 102 and 107.

Sliders 102 and 107 are mounted on and insulated from a pivoted arm 120, and sliders 112 and 113 are fastened to and insulated from a pivoted arm 121. Arm 120 is actuated by a suitable means 122 connected to vertical gyroscope 21 in response to roll of the craft in which the instrument is mounted, and arm 121 is rotated by suitable means 123 connected with vertical gyroscope 21 in response to pitch of the craft. The gyroscope 21 is energized for rotation by any suitable pneumatic or electrical means, not shown, and is rigidly mounted to some fixed portion of the craft 124.

Slider 102 is connected to vertically effective deflecting plate 43 by conductor 125. Slider 107 is connected to vertically effective deflecting plate 42 through conductor 126', a parallel circuit comprising a fixed resistor 127 and the secondary winding 130 of coupling transformer 129 and conductor 126. It will thus be apparent that the voltage on the vertical plates 42 and 43 is the sum of the voltage between sliders 102 and 107 and the voltage drop across resistor 127 due to the output of coupling transformer 31.

Turn axis network 17, like pitch axis network 14, comprises an electric bridge made up of a pair of variable resistors 131 and 132 having sliders 133 and 134; the bridge is energized from secondary winding 67 of transformer 12. A voltage appears between sliders 133 and 134 which depends in magnitude and in phase on the amount and direction of displacement of these sliders with respect to their windings; the voltage is zero when the sliders are at the centers of their windings. Sliders 133 and 134 are carried by and insulated from a pivoted arm 135 which is actuated by suitable means 136 connecting it to directional gyroscope 22 for actuation in response to turn of the craft. Directional gyroscope 22 may be either electrically or pneumatically energized, and is also rigidly fastened to a portion of the aircraft 124.

The output of turn axis network 17 is impressed by conductors 137 and 138 across a phase shifting network comprising a resistor 140 and a capacitor 141 connected in series. The voltage drop across resistor 140 is substantially in quadrature with the voltage applied to the network, as is well known. A further phase shifting function is accomplished by adding to this voltage a second voltage derived from secondary winding 71 of transformer 12, and the phase angle between the combined voltage and that derived from winging 71 varies with variation in the magnitude of either of the components of the combined voltage: to this combination voltage is added a unidirectional voltage derived from power supply 23 in a fashion about to be described.

Power supply 23 is of conventional nature and comprises an electronic rectifier 140', a resistance-capacitance filter 141, and a voltage divider 142 made up of a fixed resistor 143 and a variable resistor 144 having a slider 145. Rectifier 140' is provided with heater energization from secondary winding 64 of transformer 12, and with anode energization from secondary winding 70 of transformer 12. Under these conditions the lower end of voltage divider 142 is negative with respect to the upper end of the divider. The common point between resistor 143 and resistor 144 is grounded as at 146. The unidirectional voltage referred to in the last paragraph as being added to the sum of two alternating voltages is the voltage drop between slider 145 and ground connection 146, and the combination voltage which is the sum of all three appears between ground connection 146 and the common terminal 147 between capacitor 141 and resistor 140.

Wave-shaping amplifier 25 comprises a first stage including a grid protective resistor 150, a triode 151 having a cathode 152, a grid 153 and a plate 154 in addition to the heater filament 155, and a plate resistor 156. This first stage is connected by a coupling capacitor 157 to a second stage including an input resistor 158, a grid protective resistor 160, a triode 161 including a cathode 162, a grid 163 and an anode 164 in addition to the heater filament 165, and a plate resistor 166. Cathodes 152 and 162 are grounded as at 167. The input circuit to wave-shaper 25 may be traced from grid 153 through conductor 170, resistor 150, conductor 171, terminal 147, resistor 140, conductor 172, secondary winding 71 of transformer 12, conductor 173, slider 145, the portion of winding 144 above slider 145, ground connection 146, and ground connection 167 to cathode 152. In this circuit it will be apparent that the voltage drop across resistor 140 derived from the turn axis network, the voltage of secondary winding 71, and a unidirectional voltage derived from the power supply 23 are connected in series so that their vector sum is the input signal to the wave-shaper.

Heater filaments 155 and 165 of triodes 151 and 161, are energized from secondary winding 64 of transformer 12. Plate voltage for triodes 151 and 161 is delivered to the plate resistances 156 and 166 from voltage divider 142 by conductors 174 and 175.

The wave form of the voltage input to wave-shaper 25 has an alternating component whose phase with respect to the output of secondary winding 67 is determined by the relation between the magnitude of the potential difference between sliders 133 and 134 in the turn axis network and the magnitude of the voltage output of secondary winding 71, and also has a unidirectional component whose magnitude is determined by the position of slider 145 in power supply 23. The unidirectional voltage functions as a bias voltage to select the point on the characteristic curve of triode 151 at which the tube is to be operated.

The alternating component of the input voltage to triode 151 is arranged to have such a magnitude as to greatly overdrive the tube: the wave-shape of the output voltage across plate resistor 156 is therefore not sinusoidal. During the half of each cycle of the grid voltage when the grid is positive the output curve is distorted to approximate a horizontal flat portion of maximum voltage between nearly vertically rising and falling portions. During the next half cycle the output voltage remains substantially at a zero value. The output voltage, having the wave form just described, is impressed on the grid of triode 161 through coupling condenser 157 and resistor 160. Triode 161 is also greatly overdriven, and functions to considerably improve the squareness of the wave-shape of the output voltage impressed upon resistor 166.

Resistor 166 cooperates with a capacitor 176 to comprise a differentiating circuit. The size of capacitor 176 is chosen to give a time constant for the circuit such that the wave form of the voltage between junction 177 and ground comprises a sharp upward peak at the instant in the cycle corresponding to the change from zero voltage to maximum voltage, and a sharp downward peak a half a cycle later at the instant corresponding to the change from maximum current to zero current.

It is considered desirable to have only a single pulse of voltage in the signal from the waveshaper for each cycle of the alternating current energizing the shaper. For this reason a clipping diode 30 is connected between junction 177 and ground: the heater filament of the diode is energized from winding 64 of transformer 12. Whenever the cathode of clipping diode 30 is negative with respect to ground, to which the plate of the diode is connected, the tube acts essentially as a short circuit across the coupling network 31 which therefore transmits no electrical energy, but when the cathode is positive with respect to ground, no clipping action takes place. By this means alternate pulses of the wave resulting from differentiation are cut off.

Coupling network 31 comprises resistor 127 connected across the secondary winding 130 of transformer 129 and a resistor 180 connected across the primary winding 181 of the transformer. Resistors 127 and 180 essentially perform impedance matching functions, while transformer 129 functions to couple the wave-shaping system with the vertical plate deflecting surface.

For illustrative purposes the width of the peak produced by the wave shaping system just described is shown to be 1/30 of the period of the alternating voltage.

In one operative embodiment of the invention the following values were used.

Source 11—115 volts 400 cycles single phase
Switch 53—Single pole single throw
Transformer 129—1:1 ratio audio interstage
Transformer 12:

| Primary 57 | volts | 115 |
|---|---|---|
| Secondary 61 | do | 300 |
| Secondary 62 | do | 6.3 |
| Secondary 63 | do | 1200 |
| Secondary 64 | do | 6.3 |
| Secondary 65 | do | 115 |
| Secondary 66 | do | 115 |
| Secondary 67 | do | 400 |
| Secondary 70 | do | 400 |
| Secondary 71 | do | 25 |

Tubes:

| 10 | 3EP1 |
|---|---|
| 74 | 7Z4 |
| 30 | 7A6 |
| 140 | 7A6 |
| 151 | 7F7 |
| 161 | 7F7 |

Resistors:

| 69 | ohms | 25,000 |
|---|---|---|
| 77 | do | 100,000 |
| 80 | do | 220,000 |
| 81 | do | 220,000 |
| 82 | do | 50,000 |
| 83 | do | 250,000 |
| 86 | do | 150,000 |
| 87 | do | 150,000 |
| 91 | do | 100,000 |
| 92 | do | 100,000 |
| 97 | do | 10,000 |
| 100 | do | 10,000 |
| 101 | do | 25,000 |
| 104 | do | 10,000 |
| 105 | do | 10,000 |
| 106 | do | 25,000 |
| 110 | do | 250,000 |
| 111 | ohms | 250,000 |
| 127 | do | 100,000 |
| 131 | do | 500,000 |
| 132 | do | 500,000 |
| 140 | do | 50,000 |
| 143 | do | 250,000 |
| 144 | do | 10,000 |
| 148 | do | 25,000 |
| 150 | do | 1,000,000 |
| 156 | do | 250,000 |
| 158 | do | 250,000 |
| 160 | do | 1,000,000 |
| 166 | do | 100,000 |
| 180 | do | 100,000 |

Condensers:

| 78 | microfarad | .25 |
|---|---|---|
| 79 | do | .25 |
| 118 | do | .5 |
| 119 | do | 1 |
| 128 | do | 1 |
| 157 | do | .05 |
| 158 | do | .25 |
| 159 | do | .25 |
| 176 | do | .05 |

*Operation of Figure 1*

The normal condition of the system as a whole will first be described. This condition prevails when the craft carrying the instrument is in straight and level flight and when switch 53 is closed. Under these conditions, the trace 182 on the screen of the cathode ray tube comprises a horizontal line centered in the tube and having a central peak 183.

It will be appreciated that due to variations in the characteristics of commercially available circuit components, it may be necessary to make certain minor adjustments in setting up the apparatus. The first step comprises uncoupling arms 120, 121 and 135 from their actuating members and setting them in their respective central positions. The electron gun is next energized and sweep voltage from circuit 15 is applied to plates 40 and 41. This produces a linear sweep across the screen of the tube which should pass through the center of the screen. If this is not the case, sliders 112 and 113 are displaced until the resulting unidirectional voltage on plates 42 and 43 is sufficient to raise or lower the line until it passes through the center of the screen. Similarly, the center of the line can be brought to the center of the screen by variation of the relationship between the resistances of resistors 91 and 92. Most convenient use of the instrument is obtained if after these two adjustments are made the tube is rotated in ring 50 until the trace is horizontal. When the normal position of the trace is determined, outline 47 may be applied to the end of the tube in the proper position, or mounted in the proper position adjacent the tube in some other convenient fashion.

The wave-shaping circuit is now energized, and peak 183 appears on trace 182. If the peak is not centered along the trace, sliders 133 and 134 are moved along their windings to bring about this centered condition. The panel instrument now indicates straight and level flight of the craft, and if the craft is actually in this condition of flight, arms 121, 120 and 135 are connected to their respective connecting means 123, 122 and 136, whereupon control of the pitch axis and roll axis networks is turned over to the vertical gyroscope, and control of the turn axis network is turned over to the directional gyroscope. These adjustments need ordinarily not be altered until the cathode ray tube requires replacement.

Under the conditions just recited, an alternating voltage of constant amplitude is maintained between horizontally effective plates 40 and 41 of the cathode ray tube, through a circuit including conductors 93 and 94. Simultaneously, a complex voltage is impressed on plates 42 and 43 of the cathode ray tube through a circuit which includes conductor 123', the parallel combination of resistor 127 and secondary winding 130, conductor 126, bridge 103 of roll axis network 16, conductor 117, pitch axis network 14, conductor 116, bridge 96 of roll axis network 16, and conductor 125. The complex voltage comprises a constant unidirectional component whose value and polarity are determined by movement of sliders 112 and 113, and a pulsating unidirectional or peak component whose phase in relation to the sweep alternating voltage is determined by the position of sliders 133 and 134 and may also comprise an alternating component whose magnitude and phase are varied by actuation of sliders 102 and 107.

Suppose now that the craft departs from the desired heading. Sliders 133 and 134 are displaced from their adjusted positions by directional gyroscope 22, and the alternating voltage drop in resistor 140 changes. The voltage derived from winding 71 remains constant in magnitude and phase, and the sum of this voltage with the changing voltage from turn axis network 17 has a changing phase angle with respect to the source, thus displacing peak 183 from a central position on trace 182.

Suppose now that instead of turning, the craft goes into a bank. Under the influence of vertical gyroscope 21, arm 120 is rotated, moving sliders 102 and 107 with respect to their respective windings. This results in the appearance of a voltage between the sliders which is either in phase or out of phase with the voltage between plates 40 and 41. Since the vertical plates and the horizontal plates are in ninety degree phase relation in space as constructed in the tube, the effect of simultaneous energization of the plates by voltages either in phase or 180° out of phase results in rotation of the trace about the center of the screen: and the direction of rotation of the trace depends on whether the voltage from roll axis network 16 is in phase or out of phase with the voltage from sweep circuit 15; if, for example, the two voltages are of equal amplitude and in phase, the trace is rotated through a positive angle of 45°.

Now suppose that instead of turning or banking, the aircraft changes its attitude about the pitch axis; that is, suppose the craft goes into a climb or glide. Under control of vertical gyroscope 21, arm 121 is rotated, thus moving sliders 112 and 113 from their adjusted positions and altering the unidirectional voltage which this network applies to the vertically effective deflecting plates. The effect of this voltage is to raise or lower the trace as a whole on the screen, depending on whether the sliders are moved so that slider 113 becomes more positive or so that slider 112 becomes more positive.

It will be appreciated that change in attitude need not take place about only a single axis at one time, but that simultaneous change about any two axes or about all three axes may take place, the trace on the screen taking up a position which is determined by the resultant of the voltage change caused by the change in attitude.

Figure 1 shows the trace when the craft is in straight and level flight. Figure 3 shows the trace when the craft is in level flight but is bearing to the right of its proper heading. Figure 4 shows the trace when the craft is gliding and bearing to the left of the desired heading. Figure 5 shows the trace when the craft has the correct heading, but is banking with the left wing low.

It should further be pointed out that, while in a direct reading gyroscope the displacement of the indicator is ordinarily in nearly one-to-one ratio to the angular change in attitude of the craft, the present instrument is capable of magnification of the indication. The displacement of the trace from its normal condition, for a given displacement of the sensing potentiometer arms, is determined by the voltage applied to the associated windings, and by suitably selecting the output voltages of windings 65, 66, and 67, and the magnitudes of resistors 80 and 81, the displacement of the trace corresponding to unit deviation of the craft from its desired attitude about each axis may be given any reasonable value.

*Construction of Figure 2*

A considerable reduction of weight and simplification of circuits can be obtained if turn axis response is omitted from the instrument just described. Figure 2 shows a modification of the instrument of this general nature, and also shows an alternative means for providing the unidirectional voltage necessary for pitch axis indication.

In Figure 2, the cathode ray tube 10 is shown in fragmentary fashion, only horizontal plates 40 and 41 and vertical plates 42 and 43 being included. It will, of course, be appreciated that the electron gun and its energizing circuit, and the fluorescent screen, are also required, and may be provided in any conventional fashion. In addition to cathode ray tube 10 and source 11, the structure of Figure 2 comprises a transformer 200, a roll axis bridge 201, a pitch axis bridge 202, a phase responsive rectifier 203 including a load network 204, a coupling transformer 205, and a sweep circuit 208. Roll axis network 201 and pitch axis network 202 are actuated by the vertical gyroscope 20.

Transformer 200 serves to energize the roll axis and pitch axis bridge, the sweep circuit, and the discriminating rectifier. Roll axis bridge 201 provides to transformer 205 an alternating voltage whose phase and magnitude are controlled in accordance with roll of the craft. Pitch axis bridge 202 provides to the discriminating rectifier 203 an alternating voltage whose phase and amplitude vary with pitch of the craft. Discriminating rectifier 203 serves to convert the alternating output voltage of the pitch axis network into a continuous unidirectional voltage whose polarity reverses with reversal in phase of the output of the pitch axis network, and whose amplitude varies with the amplitude of the alternating voltage. Sweep circuit 208 functions to provide a linear trace on the screen of the cathode ray tube, and coupling transformer 205 serves to combine, for applying to the plates of the cathode ray tube, the alternating voltage provided by roll axis network 201, and the continuous unidirectional voltage provided by phase responsive discriminator 203.

Transformer 200 is shown to comprise a primary winding 210 energized from source 11 and a plurality of secondary windings 211, 212, 213, 214 and 215.

Secondary winding 215 of transformer 200 energizes sweep circuit 208, which functions in exactly the same fashion as sweep circuit 14 shown in Figure 1 and is connected to horizontally effective plates 40 and 41 by conductors 216 and 217. Secondary winding 211 of transformer 200 energizes roll axis bridge 201 and pitch axis bridge 202 through conductors 220 and 221.

Roll axis bridge 201 comprises a pair of variable resistors 222 and 223, the former having a manually operable slider 224 and the latter having a slider 225 which is actuated by a connection 226 to vertical gyroscope 20. The unbalance voltage of bridge 201 is applied to transformer 205 through conductors 227 and 230.

Bridge 202 comprises a pair of variable resistors 231 and 232, the former having a manually operable slider 233 and the latter having a slider 234 operable by a connection 235 to vertical gyroscope 20. The unbalance voltage of bridge 202 is applied to discriminator 203 by conductors 236 and 237 through a coupling capacitor 240.

Phase discriminating rectifier 203 is shown to comprise an input resistor 241, a pair of triodes 242 and 243, and a load network 204. Network 204 is shown to comprise fixed resistors 244, 245, 248, 249, 250 and 251 and fixed capacitors 246, 247, 252 and 253. Heater energization for triodes 242 and 243 is derived from secondary winding 214 of transformer 200 through conductors 254 and 255. Plate energization of triode 242 is obtained from secondary winding 212 of transformer 200 through conductors 256 and 257, and plate energization for triode 243 is obtained from secondary winding 213 of transformer 200 through conductors 260 and 261. The output of the network 204 is associated with transformer 205 through conductors 262 and 263. Network 204 includes a ground connection 264 and circuit 208 includes a ground connection 265.

Transformer 205 includes a primary winding 266 energized from roll axis bridge 201, and a pair of secondary windings 267 and 270. Windings 267 and 270 are connected to vertically effective deflecting plates 42 and 43, respectively, by conductors 271 and 272, and to the output of network 204 by conductors 262 and 263. In one operative embodiment of the invention the following values were used:

Source 11—115 volts 400 cycle single phase alternating voltage
Transformer 200:
    Primary 210 _____volts__ 300
    Secondary 211 _____do____ 40
    Secondary 212 _____do____ 150
    Secondary 213 _____do____ 150
    Secondary 214 _____do____ 6.3
    Secondary 215 _____do____ 115
Transformer 205—20:1 ratio slip up
Tubes:
    242 _____ } 1N7
    243 _____ 
Condensers:
    246 _____
    247 _____
    252 _____
    253 _____
    240 _____do____ .01
Resistors:
    223 _____ohms__ 2,000
    224 _____do____ 2,000
    231 _____do____ 2,000
    232 _____do____ 2,000
    241 _____do____ 500,000
    244 _____do____ 1,000,000
    245 _____do____ 1,000,000
    246 _____ohms__ 50,000
    249 _____do____ 50,000
    250 _____do____ 1,000,000
    251 _____do____ 1,000,000
    271 _____do____ 150,000
    272 _____do____ 150,000
    273 _____do____ 100,000
    274 _____do____ 100,000

*Operation of Figure 2*

In general, the system disclosed in Figure 2 functions in the same fashion as that disclosed in Figure 1, except that the turn axis structure and its components are omitted. In the modification of the invention the trace on the screen has no central peak, but comprises a straight line on the screen which is raised and lowered with climb and glide of the craft and which rotates in a clockwise and counterclockwise direction with left and right bank of the craft. Assume that sliders 225, 224, 234 and 233 are at the centers of their windings, and let the system be energized. Then there will appear on the screen of the cathode ray tube a linear trace which is brought about by the alternating voltage derived from sweep circuit 208 which is impressed on horizontally effective plates 40 and 41. The tube is rotated until the trace is level, and if the trace is displaced to the left or right from a central position, this is corrected by adjustment of resistance ratios in the sweep circuit as discussed above.

It will be appreciated that if sliders 225 and 224 are at the centers of their windings, no alternating voltage is impressed on primary winding 266 of transformer 206, and therefore no alternating voltage will be induced on secondary windings 267 and 270 which function therefore merely as impedances in a circuit which may be traced from deflecting plate 42, through conductor 271, winding 267, conductor 263, load circuit 204, conductor 262, secondary winding 270, conductor 272 to plate 43. By this circuit the output voltage of network 204 is impressed on plates 42 and 43.

If the trace is not positioned vertically so that it passes through the center of the screen, it is necessary to apply to plates 42 and 43 a unidirectional voltage which will displace the trace vertically by the correct amount and in the correct direction. This voltage is obtained by operating the manually operable slider 233 of bridge 202 so that it departs from its central position. Under these conditions, an alternating voltage is impressed on resistor 241 and therefore between the grids and cathodes of triode 242 which is of the same phase as that of transformer winding 212 or the opposite phase, depending on the direction of displacement of slider 233. Alternating voltage of the same phase as that energizing the bridge is impressed on the anode of triode 242 from winding 212 of transformer 200 through conductors 256 and 257, and a parallel circuit including capacitor 246 and resistor 244, and conductor 273. Alternating voltage of the phase opposite to that in energizing the bridge is supplied to the anode of triode 243 through conductors 261 and 260, a parallel circuit including resistor 245 and capacitor 247, and conductor 273.

The anode circuits of triodes 242 and 243 are thus energized in 180° phase relationship, and the grids of the tubes are energized with alternating voltage which is in phase with one of the anode voltages and out of phase with the other anode voltage, depending on the direction of displacement of slider 233. Thus, for displacement of slider 233 in a first direction tube 242 will discharge during a first half cycle of the alternating voltage supplied by source 11, and neither tube will discharge during the ensuing half cycle, while for displacement of slider 233 in the opposite sense vacuum tube 243 will discharge during the second half cycle of the source while neither tube will discharge during the first half cycle. Upon discharge of triode 242 current flows from the upper terminal of winding 212 through conductor 256, triode 242, conductor 273, resistor 244 and conductor 257 to lower terminal of the winding, causing a pulsating voltage drop to appear across resistor 244 such that the upper terminal of the resistor is negative. The pulsations of this voltage are considerably smoothed by condenser 246, and the voltage is applied to the series circuit of resistors 248, 250, 251, 249 and 245, causing a voltage drop across resistors 250 and 251 of such a nature that the upper end of resistor 250 is negative and the lower end of resistor 251 is positive. Any residual pulsations in the voltage drop across resistors 250 and 251 are further smoothed by condensers 252 and 253. The provision of ground connection 254 stabilizes these voltages with respect to the accelerating electrodes of the tubes, which are grounded as described in connection with Figure 1.

Upon discharge of triode 243 current flows from the lower terminal of winding 213 through conductor 261, triode 243, conductor 273, resistor 245 and conductor 260 to the upper terminal of the winding, causing a pulsating voltage drop to appear across resistor 245 such that the lower terminal of the resistor is negative. The pulsations of this voltage are considerably smoothed by condenser 247 and the voltages applied to the series circuit of resistors 244, 248, 250, 251 and 249, causing a voltage drop across resistors 250 and 251 of such a nature that the upper end of resistor 250 is positive and the lower end of resistor 251 is negative. Any residual pulsations in the voltage drop across resistors 250 and 251 are further smoothed by condensers 252 and 253, as before stated.

By the means just described, it will be apparent that a unidirectional voltage difference is maintained across resistors 250 and 251 whose polarity depends on which triode is discharging and whose constant magnitude depends on the grid voltage applied to the tubes. This voltage difference is conducted through transformer windings 267 and 270 and impressed on vertically effective plates 42 and 43. To center the trace vertically on the screen it is therefore necessary only to operate slider 233 in the proper direction through the proper distance. The panel instrument now indicates straight and level flight, and if the craft is actually in a condition and an attitude of straight and level flight the vertical gyroscope is connected to sliders 225 and 234 through connecting means 226 and 235 and the instrument is ready for use.

If the craft departs from its level attitude about the pitch axis, slider 234 is displaced along resistor 232, thus altering the voltage applied across input resistance 241 of the discriminating rectifier and possibly changing its phase. By means already described in connection with centering the trace vertically, any unbalance of bridge 202, whether brought about by movement of slider 233 manually or movement of slider 234 under the control of the vertical gyroscope, impresses a continuous unidirectional voltage on conductors 262 and 263 and therefore on vertical plates 42 and 43. This results in vertical displacement of the trace to indicate climb or dive of the craft as the case may be.

If the craft is displaced about the roll axis an alternating voltage appears between sliders 224 and 225 of the roll axis bridge, and is impressed upon primary winding 266 of transformer 205. Voltages of like phase therefore appear in secondary windings 267 and 270 and are added in a circuit which is completed by means of conductors 262 and 263 through resistors 250 and 251 of load network 204. The alternating voltage is therefore impressed between vertical plates 42 and 43, and this voltage is either in phase with the voltage on plates 40 and 41 from sweep circuit 203 or 180 degrees out of phase with it, and rotation of the sweep about its center takes place exactly as described in connection with Figure 1. It will be apparent that both roll and pitch of the craft can take place at the same time and be independently or jointly indicated on the screen of the cathode ray tube in the same fashion as that shown in Figures 3, 4 and 5, except that the trace provided by the present instrument is the simple straight line.

If it is desired to use the circuit of Figure 2 and still retain the directional gyro and turn axis response, this can easily be accomplished by opening conductor 271 between the points A and B in Figure 2 and connecting to the points A and B the portion of Figure 1 shown to the right of points A and B in that figure. If this is desired, it will be appreciated that so much of transformer 12 as is necessary to the turn axis function must also be included in the device.

Numerous objects and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. An instrument for indicating variation in a plurality of conditions and comprising, in combination: means giving a single continuous indication variable in distinguishable characteristics when variably energized with continuous unidirectional voltage and with pulsating unidirectional voltage; means maintaining said indicating means in a normal condition; a source of alternating voltage; means deriving from said source a variable continuous unidirectional voltage and a variable pulsating unidirectional voltage; means adding said voltages; means applying the resulting voltage to said indicating means; means varying said continuous unidirectional voltage in response to change in a first of said conditions; and means varying said pulsating unidirectional voltage in response to change in a second of said conditions.

2. An instrument for indicating variation in a plurality of conditions comprising, in combination: means giving a single continuous indication variable in distinguishable characteristics when variably energized with alternating voltage, with continuous unidirectional voltage, and with pulsating unidirectional voltage; means maintaining said indicating means in a normal condition; a source of alternating voltage; means deriving from said source a variable alternating voltage, a variable continuous unidirectional voltage, and a variable pulsating unidirectional voltage; means adding said voltages; means applying the resulting voltage to said indicating means; means varying said alternating voltage in response to change in a first of said conditions; means varying said continuous unidirectional voltage in response to change in a second of said conditions; and means varying said pulsating unidirectional voltage in response to change in a third of said conditions.

3. An instrument for indicating the relation between the actual attitude of a body and a normal attitude comprising, in combination: a cathode ray tube including an electron gun, first and second pairs of beam deflecting plates in effective ninety degree relationship, and a viewing screen; an index of attitude associated therewith; means for coordinating said index of attitude with the attitude of said body; means normally energizing said electron gun to direct a beam of electrons between the plates of said pairs for visible impingement upon said screen; a source of alternating voltage; means continuously applying a first alternating voltage, derived from said source, to said first pair of plates, whereby to produce a single continuous linear trace on said screen; means for initially coordinating said trace with said index of attitude; means deriving a second alternating voltage of fixed phase and a third alternating voltage of variable phase from said source; means adding said derived voltages in series to give a resulting voltage; means deriving from said resulting voltage a pulsating unidirectional voltage; means applying said pulsating voltage to said second pair of plates in a selected phase relation as compared to said first alternating voltage; whereby to add to said linear trace a single normally central peak; a directional gyroscope; turn responsive means actuated by said gyroscope; and means including said turn responsive means for varying the phase relation between said pulsating voltage and said first derived voltage, whereby to displace said peak from said central position to an extent and in a sense determined by the extent and sense of the displacement of said body from said normal attitude.

4. An instrument for indicating the relation between the actual attitude of a body, with respect to pitch, roll, and turn axes, and a level, directed attitude, comprising, in combination: a cathode ray tube including an electron gun, first and second pairs of beam deflecting plates in effective ninety degree relation, and a viewing screen; an index of attitude associated therewith; means for coordinating said index of attitude with the attitude of said body; means normally energizing said electron gun to direct a beam of electrons between the plates of said pairs for visible impingement upon said screen; a source of alternating voltage; means continuously applying a first alternating voltage, derived from said source, to said first pair of plates, whereby to produce a single continuous linear trace on said screen; means deriving a second alternating voltage of fixed phase and a third alternating voltage of variable phase from said source; means adding said derived voltages in series to give a resulting voltage; means deriving from said resulting voltage a pulsating unidirectional voltage; means applying said pulsating voltage to said second pair of plates in a selected phase relation as compared to said first alternating voltage, whereby to add to said linear trace a single normally central peak; means for initially coordinating said trace with said index of attitude; a vertical gyroscope; pitch responsive means and roll responsive means actuated by said gyroscope; a directional instrument; turn responsive means actuated by said instrument; means actuated by said pitch responsive means for applying a unidirectional voltage derived from said source to said second pair of plates independently of said pulsating voltage, whereby to translate said trace from coordinated relation with said index; means actuated by said roll responsive means for applying a further alternating voltage, derived from said source, to said second pair of plates independently of said pulsating voltage and said unidirectional voltage, whereby to rotate said trace with respect to said index, and means actuated by said turn responsive means for varying the phase relation between said pulsating voltage and said first derived voltage, whereby to displace said peak along said trace from said central position; the sense and direction of said translation, said rotation, and said displacement being determined respectively by the sense and direction of the displacement of said body from said level directed attitude about said pitch, roll, and turn axes respectively.

5. An instrument for indicating the attitude of a craft comprising a normally energized cathode ray tube having horizontally and vertically effective plates and a viewing screen; and means providing on said screen a single continuous linear trace variable in accordance with roll, pitch, and turn of said craft; said last named means including means continuously energizing said horizontally effective plates with alternating voltage of a selected frequency, and means variably energizing said vertical plates with a complex voltage, said means comprising first and second bridges energized with alternating voltage, a third bridge energized with unidirectional voltage, wave shaping means, means unbalancing said first bridge in accordance with roll of the craft; means unbalancing said second bridge in accordance with turn of the craft; means unbalancing said third bridge in accordance with pitch of the craft; means energizing said wave shaping means in accordance with unbalance of said second bridge; and means applying to said vertical plates the sum of the outputs of said first and third bridges and of said wave shaping means.

6. An instrument for indicating variation in a plurality of conditions from selected values comprising, in combination: means giving a single continuous indication variable in a plurality of distinguishable characteristics when variably energized with continuous unidirectional voltage and with pulsating unidirectional voltage; means normally maintaining said characteristics in a selected state; means supplying a continuous unidirectional voltage which varies in accordance with a first condition; means supplying a pulsating unidirectional voltage which varies with a second condition; means adding said voltages; and means applying the resulting voltage to said first named means, to cause said characteristics to depart from said selected state when said conditions depart from selected values.

7. An instrument for indicating the relation between the actual attitude of a body, with respect to a selected axis, and a normal attitude of the body, comprising, in combination: a cathode ray oscilloscope including means projecting a beam of electrons along an axis to impinge upon a fluorescent screen and means energizable to deflect said beam from said axis; a source of alternating voltage of a selected frequency; a source of pulsating unidirectional voltage having a repetition rate which is the same as the frequency of said alternating voltage, the width of each pulse being small compared to the length of a cycle of said alternating voltages; means varying instants of occurrence of said pulses in the cycles of said alternating voltage, in accordance with displacement of said body from said normal attitude about said axis; and means, including said last named means, simultaneously connecting said voltages to said deflecting means, to provide a linear trace having a narrow, normally central peak which is displaced therealong with change in the attitude of the body.

8. An instrument for indicating the relation between the actual attitude of a body, with respect to a plurality of axes, and a normal attitude of the body, comprising, in combination: a cathode ray oscilloscope including means projecting a beam of electrons along an axis to impinge upon a fluorescent screen and means energizable to deflect said beam from said axis; a source of alternating voltage of a selected frequency; means applying said alternating voltage to said deflecting means to provide a linear trace on said screen; an index of attitude; means mounting said index adjacent said screen to define a standard position of said trace; means for aligning said trace with said index; a plurality of further sources of voltage including a source of periodic pulsating unidirectional voltage having a repetition rate which is the same as the frequency of said alternating voltage, the width of each pulse being small compared to the length of a cycle of said alternating voltage; means varying characteristics of at least two of the further voltages in accordance with displacement of the body from the normal attitude about at least two axes; and means simultaneously applying said varied voltages to said deflecting means so as to displace said trace from alignment with said index in accordance with displacement of said body from normal attitude about at least one axis and to provide a narrow peak on said trace which departs from a normal location therealong in accordance with displacement of said body from normal attitude about a further axis.

9. An instrument for indicating the relation between the actual attitude of a body, with respect to a plurality of axes, and a normal attitude of the body, comprising, in combination: a cathode ray oscilloscope including means projecting a beam of electrons along an axis to impinge upon a fluorescent screen and means energizable to deflect said beam from said axis; a source of alternating voltage of a selected frequency; means applying said alternating voltage to said deflecting means to provide a linear trace on said screen; an index of attitude; means mounting said index adjacent said screen to define a standard position of said trace; means for aligning said trace with said index; a plurality of further sources of voltage including a source of pulsating unidirectional voltage having a repetition rate which is the same as the frequency of said alternating voltage, the width of each pulse being small compared to the length of a cycle of said alternating voltage; means varying characteristics of the further voltages in accordance with displacement of the body from the normal attitude about its axes; and means simultaneously applying said varied voltages to said deflecting means, so as to displace said trace from alignment with said index in distinguishable fashions in accordance with displacements of said body from said normal attitude about at least two axes and to provide a narrow peak on said trace which departs from a normal location therealong in accordance with displacement of said body from said normal attitude about a further axis.

10. An instrument for indicating the relation between the actual attitude of a body, with respect to a selected axis, and a normal attitude of the body, comprising, in combination: a cathode ray oscilloscope including means projecting a beam of electrons along an axis to impinge upon a fluorescent screen and means energizable to deflect said beam from said axis; a source of alternating voltage of a selected frequency; a source of pulsating unidirectional voltage having a repetition rate which is the same as the frequency of said alternating voltage, the width of each pulse being small compared to the length of a cycle of said alternating voltage; a directional gyroscope; means actuated by said gyroscope to shift the instants of occurrence of said pulses, in the cycles of said alternating voltage, in accordance with displacement of said body from said normal attitude about said axis; and means, including said last named means, simultaneously applying said voltages to said deflecting means, to provide a linear trace having a narrow, normally central peak which is displaced therealong with change in said attitude of the body.

11. An instrument for indicating the relation between the actual attitude of a body, with respect to a plurality of axes, and a normal attitude of the body, comprising, in combination: a cathode ray oscilloscope including means projecting a beam of electrons along an axis to impinge upon a fluorescent screen and means energizable to deflect said beam from said axis; a source of alternating voltage of a selected frequency; means applying said alternating voltage to said deflecting means to provide a linear trace on said screen; an index of attitude; means mounting said index adjacent said screen to define a standard position of said trace; means for aligning said trace with said index; a plurality of further sources of voltage including a source of pulsating unidirectional voltage having a repetition rate which is the same as the frequency of said alternating voltage, the width of each pulse being small compared to the length of a cycle of said alternating voltage; a directional gyroscope; a vertical gyroscope; means actuated by said gyroscopes to vary characteristics of at least two of the further voltages in accordance with displacement of the body from the normal attitude about at least two axes; and means simultaneously applying said varied voltages to said deflecting means so as to displace said trace from alignment with said index in accordance with displacement of said body from said normal attitude about at least one axis and to provide a narrow peak on said trace which departs from a normal location therealong in accordance with displacement of said body from said normal attitude about a further axis.

12. An instrument for indicating the relation between the actual attitude of a body, with respect to a plurality of axes, and a normal attitude of the body, comprising, in combination:

a cathode ray oscilloscope including means projecting a beam of electrons along an axis to impinge upon a flucrescent screen and means energizable to deflect said beam from said axis; a source of alternating voltage of a selected frequency; means applying said alternating voltage to said deflecting means to provide a linear trace on said screen; an index of attitude; means mounting said index adjacent said screen to define a standard position of said trace; means for aligning said trace with said index; a plurality of further sources of voltage including a source of pulsating unidirectional voltage having a repetition rate which is the same as the frequency of said alternating voltage, the width of each pulse being small compared to the length of a cycle of said alternating voltage; a directional gyroscope; a vertical gyroscope; means actuated by said gyroscopes to vary characteristics of the further voltages in accordance with displacement of the body from the normal attitude about its axes; and means simultaneously applying said varied voltages to said deflecting means, so as to displace said trace from alignment with said index in distinguishable fashions in accordance with displacements of said body from said normal attitude about at least two axes and to provide a narrow peak on said trace which departs from a normal location therealong in accordance with displacement of said body from said normal attitude about a further axis.

MERLE R. LUDWIG.

References Cited in the file of this patent

UNITED STATES PATENTS

| Number | Name | Date |
|---|---|---|
| Re. 22,704 | Moseley | Dec. 25, 1945 |
| 1,959,309 | Smith | May 15, 1934 |
| 2,148,044 | Boswau | Feb. 21, 1939 |
| 2,262,245 | Moseley et al. | Nov. 11, 1941 |
| 2,384,484 | Norden et al. | Sept. 11, 1945 |
| 2,394,196 | Morgan | Feb. 5, 1946 |
| 2,400,232 | Hall | May 14, 1946 |
| 2,459,481 | Wolff et al. | Jan. 18, 1949 |
| 2,547,051 | Smith et al. | Apr. 3, 1951 |